United States Patent
Inoue et al.

(10) Patent No.: US 10,640,024 B2
(45) Date of Patent: May 5, 2020

(54) SEAT BACK FRAME

(71) Applicant: TOYOTA BOSHOKU KABUSHIKI KAISHA, Aichi-ken (JP)

(72) Inventors: Takuya Inoue, Aichi-ken (JP); Kazunobu Nuno, Toyama-ken (JP); Hiroaki Yamazaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 45 days.

(21) Appl. No.: 16/139,509

(22) Filed: Sep. 24, 2018

(65) Prior Publication Data
US 2019/0092198 A1    Mar. 28, 2019

(30) Foreign Application Priority Data

Sep. 27, 2017  (JP) .................................. 2017-186034

(51) Int. Cl.
*B60N 2/838*   (2018.01)
*B60N 2/809*   (2018.01)
*B60N 2/897*   (2018.01)
*B60N 2/68*    (2006.01)

(52) U.S. Cl.
CPC .............. *B60N 2/68* (2013.01); *B60N 2/682* (2013.01); *B60N 2/897* (2018.02)

(58) Field of Classification Search
CPC . B60N 2/809; B60N 2/68; B60N 2/80; B60N 2/865; B60N 2/897; B60N 2/818; B60N 2/682; B60N 2/806
See application file for complete search history.

(56) References Cited

U.S. PATENT DOCUMENTS

| | | | | | |
|---|---|---|---|---|---|
| D282,522 | S | * | 2/1986 | Meeks | ............................. D8/71 |
| 5,080,437 | A | * | 1/1992 | Pesta | ...................... B60N 2/818 |
| | | | | | 297/410 |
| 8,474,913 | B2 | * | 7/2013 | Line | ...................... B60N 2/809 |
| | | | | | 297/391 |
| 9,187,017 | B2 | * | 11/2015 | Ronzi | ..................... B60N 2/812 |
| 9,845,032 | B1 | * | 12/2017 | Line | ..................... B60N 2/5858 |
| 10,099,590 | B2 | * | 10/2018 | Takahashi | .............. B60N 2/809 |
| 2012/0280552 | A1 | * | 11/2012 | Line | ........................ B60N 2/809 |
| | | | | | 297/440.1 |

(Continued)

FOREIGN PATENT DOCUMENTS

JP        2014-024384        2/2014

*Primary Examiner* — Shin H Kim
(74) *Attorney, Agent, or Firm* — Greenblum & Bernstein, P.L.C.

(57) ABSTRACT

A seat back frame includes an upper frame having a first through-hole, a bracket having a second through-hole, and a holder including a first locking portion and a second locking portion. The upper frame includes a first inner edge portion, and the first inner edge portion inwardly defines an opening of the first through-hole located opposite to the bracket. The bracket includes a second inner edge portion, and the second inner edge portion inwardly defines an opening of the second through-hole located opposite to the upper frame. The first locking portion is locked to the first inner edge portion and the second locking portion is locked to the second inner edge portion to allow the first locking portion and the second locking portion to retain the upper frame and the bracket therebetween in the up-down direction.

6 Claims, 4 Drawing Sheets

(56) References Cited

U.S. PATENT DOCUMENTS

| | | | | |
|---|---|---|---|---|
| 2013/0082504 A1* | 4/2013 | Archambault | ........... | B60N 2/68 |
| | | | | 297/452.18 |
| 2014/0252839 A1* | 9/2014 | Fleischheuer | ............ | B60N 2/80 |
| | | | | 297/463.1 |
| 2014/0375099 A1* | 12/2014 | Kitou | ..................... | B60N 2/682 |
| | | | | 297/391 |
| 2015/0231997 A1* | 8/2015 | Itoi | ....................... | B60N 2/682 |
| | | | | 297/391 |
| 2015/0306994 A1* | 10/2015 | Kitou | ..................... | B60N 2/838 |
| | | | | 297/408 |
| 2015/0329021 A1* | 11/2015 | Aquillue | .................. | B60N 2/80 |
| | | | | 297/391 |
| 2016/0023583 A1* | 1/2016 | Yasuda | .................... | B60N 2/68 |
| | | | | 297/391 |
| 2016/0031346 A1* | 2/2016 | Mildner | ................. | B60N 2/809 |
| | | | | 296/64 |
| 2016/0052430 A1* | 2/2016 | Abe | ......................... | B60N 2/80 |
| | | | | 297/410 |
| 2016/0166064 A1* | 6/2016 | Takahashi | .............. | A47C 7/383 |
| | | | | 297/404 |

\* cited by examiner

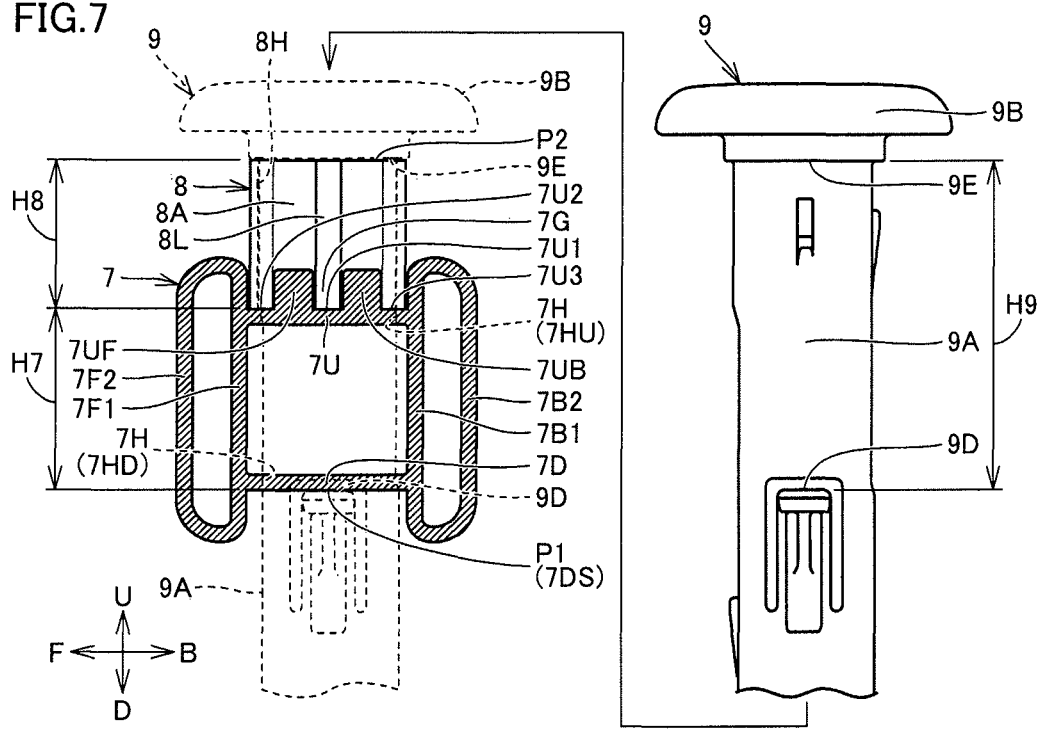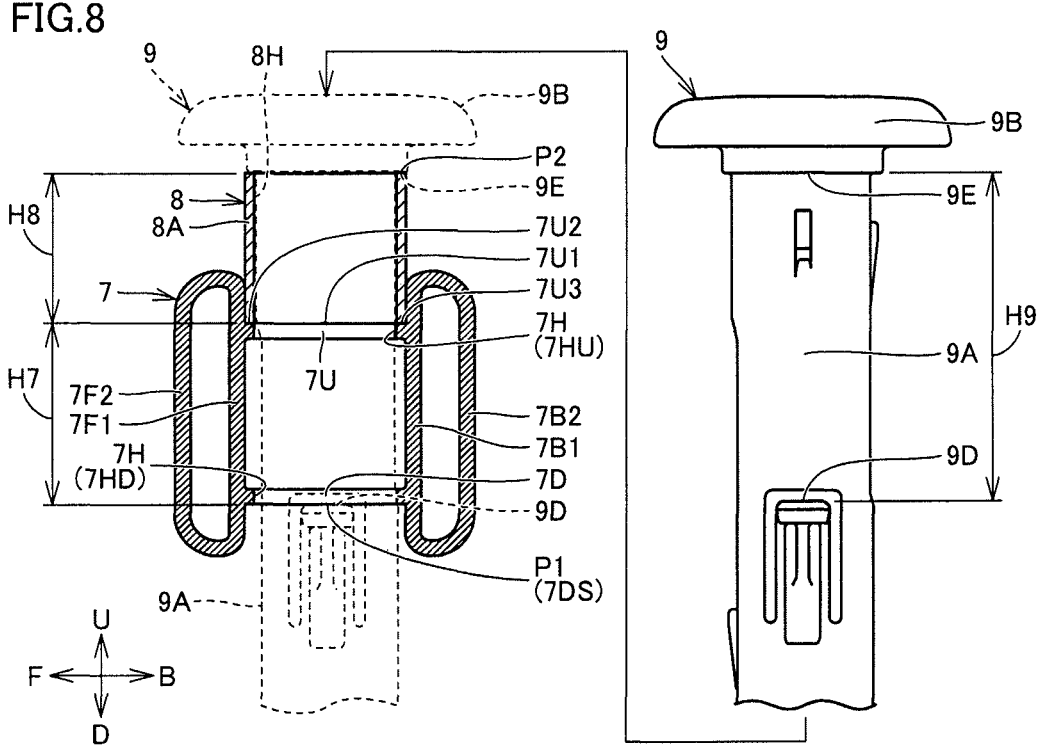

SEAT BACK FRAME

This nonprovisional application is based on Japanese Patent Application No. 2017-186034 filed on Sep. 27, 2017, with the Japan Patent Office, the entire contents of which are hereby incorporated by reference.

BACKGROUND

Field

This specification relates to a seat back frame forming a framework of a seat back.

Description of the Background Art

As disclosed in Japanese Patent Laying-Open No. 2014-024384, a headrest is provided on top of a seat back. A bracket (support) is fixed to an upper frame of a seat back frame. A holder is inserted into the bracket, and a headrest stay is inserted into the holder, so that the headrest is fixed. Known techniques for fixing a bracket to an upper frame include welding and plastic deformation (Japanese Patent Laying-Open No. 2014-024384).

In adopting the technique of fixing a bracket to an upper frame by welding, a welding step (downstream process) is necessary after temporarily fixing the bracket to the upper frame. Also in adopting the technique of fixing a bracket to an upper frame by plastic deformation (Japanese Patent Laying-Open No. 2014-024384), a step (downstream process) for plastic deformation is necessary after temporarily fixing the bracket to the upper frame. Adoption of such a fixing technique needs both the temporary fixing and downstream process, and accordingly, a dedicated jig and equipment for the temporary fixing and downstream process need to be prepared. This specification has an object to disclose a seat back frame having a configuration that allows a bracket for fixing a headrest to a seat back to be fixed to an upper frame by a technique simpler than a conventional technique.

SUMMARY

A seat back frame disclosed herein includes an upper frame, a bracket, and a holder. The upper frame has a first through-hole passing therethrough in an up-down direction and extends in a seat width direction. The bracket has a second through-hole passing therethrough in the up-down direction and is arranged to allow the first through-hole and the second through-hole to be aligned with each other in the up-down direction. The holder includes a columnar portion extending in the up-down direction and a first locking portion and a second locking portion provided respectively on one side and another side of the columnar portion in the up-down direction. A portion of the columnar portion between the first locking portion and the second locking portion is arranged to pass through both the first through-hole and the second through-hole. The upper frame includes a first inner edge portion, and the first inner edge portion inwardly defines an opening of the first through-hole located opposite to the bracket. The bracket includes a second inner edge portion, and the second inner edge portion inwardly defines an opening of the second through-hole located opposite to the upper frame. The first locking portion is locked to the first inner edge portion and the second locking portion is locked to the second inner edge portion to allow the first locking portion and the second locking portion to retain the upper frame and the bracket therebetween in the up-down direction.

The foregoing and other objects, features, aspects and advantages disclosed herein will become more apparent from the following detailed description when taken in conjunction with the accompanying drawings.

BRIEF DESCRIPTION OF THE DRAWINGS

FIG. 7 is a sectional view taken along line VII-VII in FIG. 5.

FIG. 8 is a sectional view taken along line VIII-VIII in FIG. 5.

DESCRIPTION OF THE PREFERRED EMBODIMENTS

Figure 1:
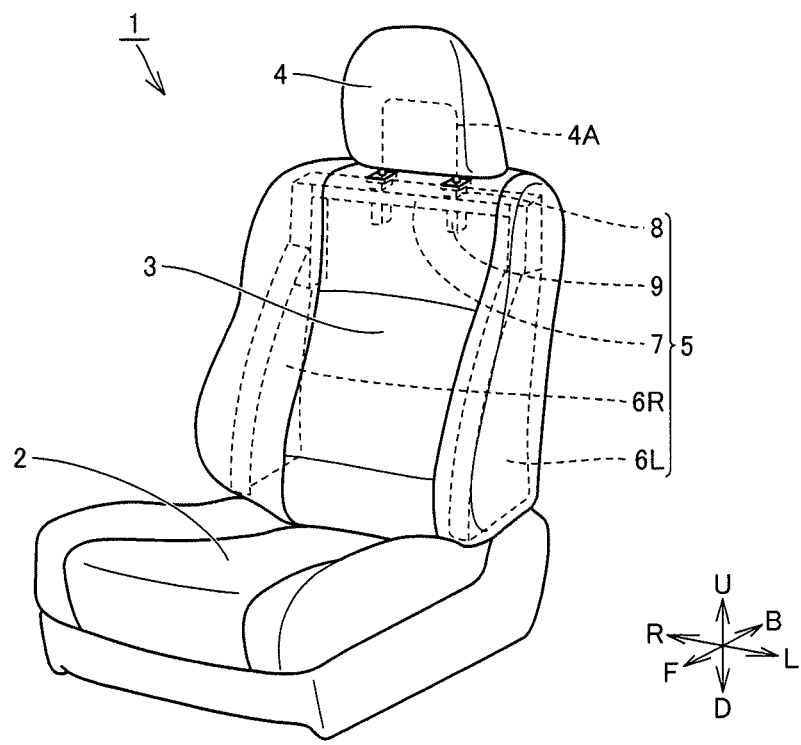
FIG. 1 is a perspective view of a vehicle seat 1 including a seat back frame 5 in an embodiment.

A seat back frame 5 and a vehicle seat 1 including seat back frame 5 in an embodiment will now be described with reference to FIGS. 1 to 8. The same and corresponding components are designated by the same reference numerals and redundant description may not be repeated.

FIGS. 1 to 8 show arrows F, B, L, R, U, and D. The directions indicated by arrows F, B, L, R, U, and D respectively indicate front, rear, left, right, up, and down as seen from an occupant seated on a vehicle seat 1. The up-down direction of vehicle seat 1 corresponds to the direction indicated by arrows U and D, which normally coincides with the height direction of the vehicle in which vehicle seat 1 is mounted. The seat width direction of vehicle seat 1 corresponds to the direction indicated by arrows L and R, which normally coincides with the vehicle width direction of the vehicle in which vehicle seat 1 is mounted. The front-rear direction of vehicle seat 1 corresponds to the direction indicated by arrows F and B, which normally coincides with the front-rear direction of the vehicle in which vehicle seat 1 is mounted.

[Vehicle Seat 1]

FIG. 1 is a perspective view of vehicle seat 1 including seat back frame 5 in an embodiment. Vehicle seat 1 includes a seat cushion 2, a seat back 3, a headrest 4, and seat back frame 5. Seat cushion 2 has a seating surface formed on its upper surface, and seat back 3 has a backrest surface formed on its front surface.

Headrest 4 is provided on top of seat back 3. Headrest 4 has a headrest stay 4A. Headrest stay 4A has two rod-shaped portions extending downward from the lower surface of headrest 4. Each of these two rod-shaped portions is inserted into an insertion hole 9H of a holder 9 (see FIG. 2), as will be described below in detail. Headrest 4 is fixed through headrest stay 4A, holder 9, and bracket 8 to seat back frame 5.

[Seat Back Frame 5]

Seat back frame 5 forms a framework of seat back 3 (see FIG. 1). Seat back frame 5 in the present embodiment includes an upper frame 7, a pair of side frames 6L and 6R, a pair of brackets 8, and a pair of holders 9.

Figure 3:
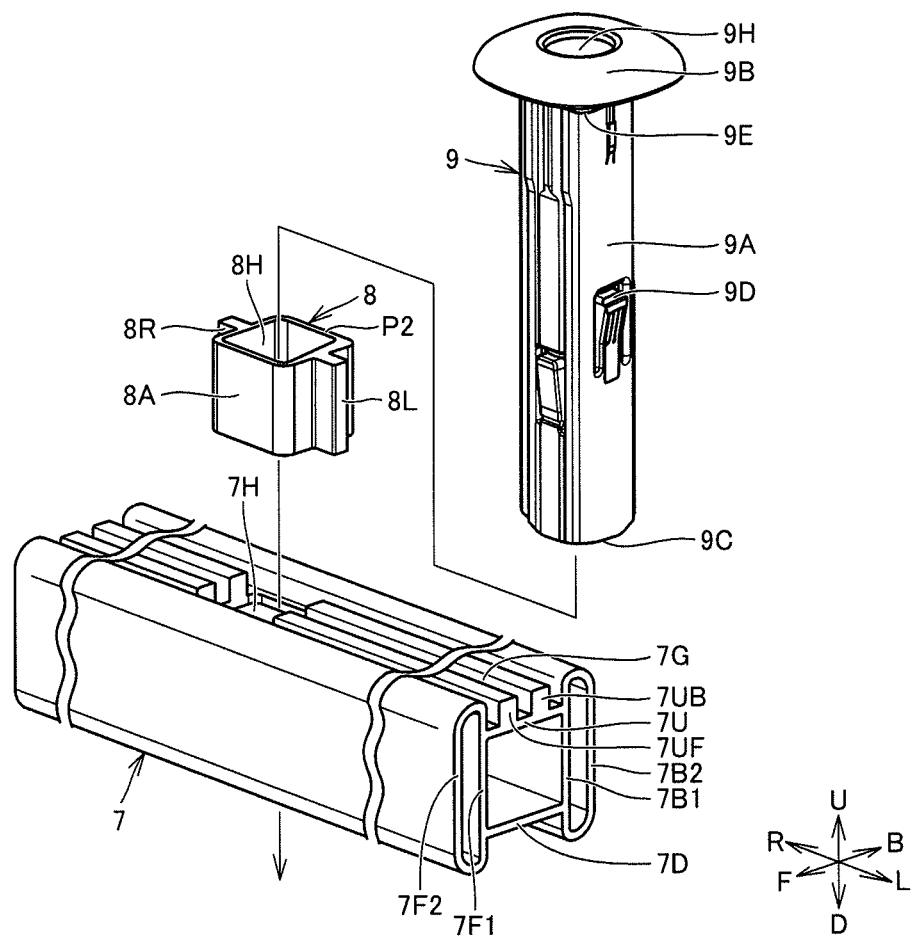
FIG. 3 is a perspective view showing a state in which bracket 8 and holder 9 are separated from upper frame 7.

Side frames 6L and 6R have a shape extending in the up-down direction. Upper frame 7 has a shape extending in the seat width direction. The left end of upper frame 7 is fixed to the upper end portion of side frame 6L, and the right end of upper frame 7 is fixed to the upper end portion of side frame 6R. Each of the pair of brackets 8 is provided on upper frame 7 (FIG. 3). Each of the pair of holders 9 is inserted into bracket 8 to be fixed through bracket 8 to upper frame 7. A further detailed description will be given below.

Figure 2:
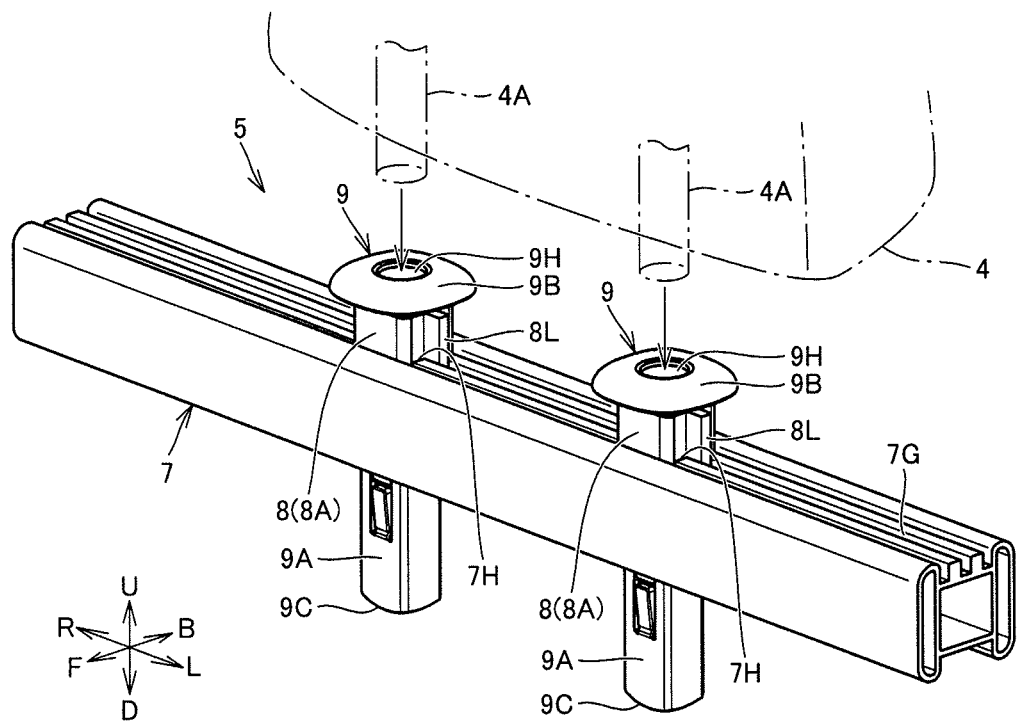
FIG. 2 is a perspective view showing a state in which a bracket 8 and a holder 9 are fixed to an upper frame 7.
Figure 4:
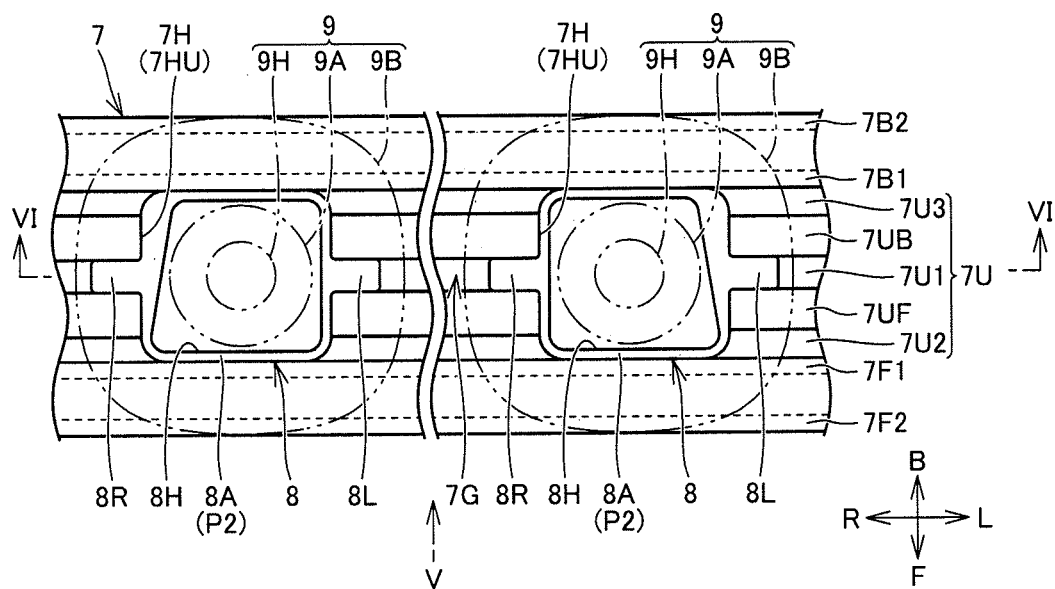
FIG. 4 is a plan view showing a state in which bracket 8 and holder 9 are fixed to upper frame 7.
Figure 5:
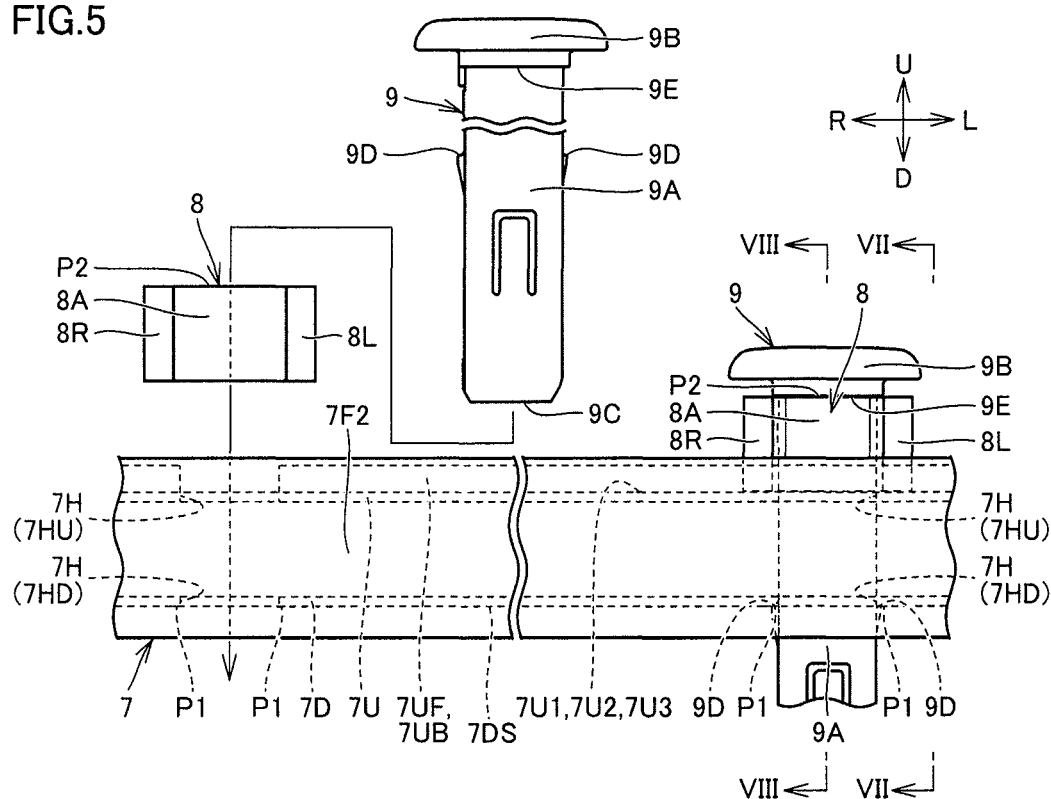
FIG. 5 is a front view of upper frame 7, bracket 8, and holder 9, showing these members seen in a direction indicated by arrow V in FIG. 4.
Figure 6:
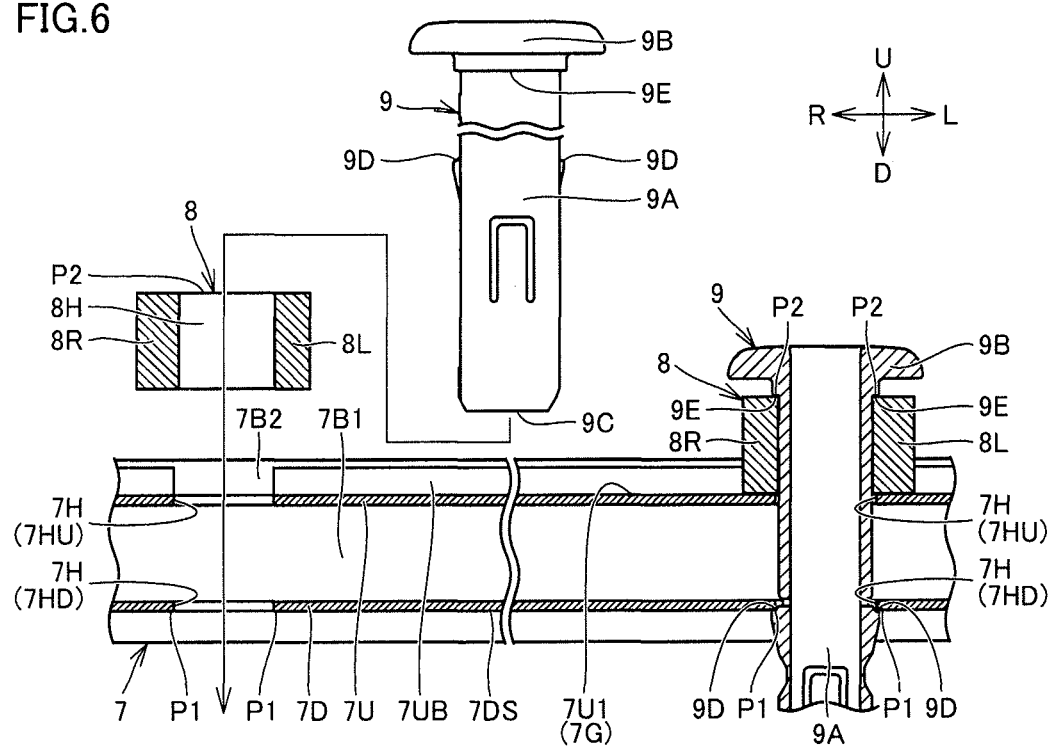
FIG. 6 is a sectional view taken along line VI-VI in FIG. 4.

FIG. 2 is a perspective view showing a state in which bracket 8 and holder 9 are fixed to upper frame 7. FIG. 3 is a perspective view showing a state in which bracket 8 and holder 9 are separated from upper frame 7. FIG. 4 is a plan view showing a state in which bracket 8 and holder 9 are fixed to upper frame 7. For the sake of convenience of description, holder 9 is indicated by a chain double-dashed line in FIG. 4. FIG. 5 is a front view of upper frame 7, bracket 8, and holder 9, showing these members seen from the direction indicated by arrow V in FIG. 4. FIG. 6 is a sectional view taken along line VI-VI in FIG. 4. FIG. 7 is a sectional view taken along line VII-VII in FIG. 5. FIG. 8 is a sectional view taken along line VIII-VIII in FIG. 5.

[Upper Frame 7]

As shown in FIGS. 2 to 6 (mainly FIG. 3), upper frame 7 has a shape extending in the seat width direction. Upper frame 7 has a first through-hole 7H passing through upper frame 7 in the up-down direction. The material for upper frame 7 is, for example, aluminum or aluminum alloy. Upper frame 7 can be formed by being cut from an extrusion material having a constant cross-sectional shape in the direction orthogonal to the seat width direction.

As shown in FIGS. 3 to 8 (mainly FIGS. 3 and 7), upper frame 7 includes an upper plate 7U, a lower plate 7D, a first upright wall 7F1, a front wall 7F2, a second upright wall 7B1, a rear wall 7B2, a front projection 7UF, and a rear projection 7UB. Upper plate 7U and lower plate 7D are parallel to each other and are opposed to each other with a spacing therebetween in the up-down direction. The upper surface (upper surfaces 7U2, 7U3) of upper plate 7U and a lower surface 7DS of lower plate 7D are apart from each other with a distance H7 (FIGS. 7 and 8) therebetween in the up-down direction.

Upper plate 7U has two openings 7HU (FIG. 6). Two openings 7HU pass through upper plate 7U in the up-down direction and are apart from each other in the seat width direction. The length of upper plate 7U in the front-rear direction is smaller than the length of opening 7HU in the front-rear direction (FIG. 8). Opening 7HU is formed in upper plate 7U while leaving a part of upper plate 7U on the front side (upper surface 7U2 described below) and a part of upper plate 7U on the rear side (upper surface 7U3 described below).

Two openings 7HD (FIG. 6) are formed in lower plate 7D. Two openings 7HD pass through lower plate 7D in the up-down direction and are apart from each other in the seat width direction. Lower surface 7DS of lower plate 7D of upper frame 7 has a first inner edge portion P1 (FIGS. 6 and 8). First inner edge portion P1 is a part of lower surface 7DS (FIG. 6) and defines opening 7HD inside first inner edge portion P1. First inner edge portion P1 is locked with a first locking portion 9D of holder 9, as will be described below in detail.

Openings 7HU and 7HD form first through-hole 7H of upper frame 7 (FIG. 8). Opening 7HU is a part of first through-hole 7H and corresponds to an opening of first through-hole 7H located on a bracket 8 side. Opening 7HD is another part of first through-hole 7H and corresponds to an opening of first through-hole 7H located opposite to bracket 8. With this configuration, upper frame 7 has first inner edge portion P1 inwardly defining opening 7HD of first through-hole 7H located opposite to bracket 8.

First upright wall 7F1 and second upright wall 7B1 are parallel to each other and are opposed to each other with a spacing therebetween in the front-rear direction. First upright wall 7F1 extends in the up-down direction to connect the front end of upper plate 7U and the front end of lower plate 7D to each other, and second upright wall 7B1 extends in the up-down direction to connect the rear end of upper plate 7U and the rear end of lower plate 7D to each other. A hollow space extending in the seat width direction is defined among upper plate 7U, lower plate 7D, first upright wall 7F1, and second upright wall 7B1.

Front wall 7F2 has a generally C-shaped cross-sectional shape and is arranged in front of first upright wall 7F1. Front wall 7F2 connects the upper end and the lower end of first upright wall 7F1 to each other, and a hollow space extending in the seat width direction is defined between front wall 7F2 and first upright wall 7F1. Rear wall 7B2 also has a generally C-shaped (opposite to front wall 7F2) cross-sectional shape and is arranged behind second upright wall 7B1. Rear wall 7B2 connects the upper end and the lower end of second upright wall 7B1 to each other, and a hollow space extending in the seat width direction is also defined between rear wall 7B2 and second upright wall 7B1.

As shown in FIG. 7, front projection 7UF and rear projection 7UB have a shape projecting upwardly from upper plate 7U and extend in the seat width direction. Front projection 7UF and rear projection 7UB are parallel to each other and are opposed to each other with a spacing therebetween in the front-rear direction. Upper surface 7U1 of upper plate 7U is exposed between front projection 7UF and rear projection 7UB. Upper surface 7U2 of upper plate 7U is exposed between front projection 7UF and first upright wall 7F1. Upper surface 7U3 of upper plate 7U is exposed between rear projection 7UB and second upright wall 7B1. A groove 7G extending in the seat width direction is formed at a position among upper surface 7U1, front projection 7UF, and rear projection 7UB in the upper surface of upper frame 7.

[Bracket 8]

As shown in FIG. 3, bracket 8 includes a tubular portion 8A and a pair of ribs 8L and 8R. Tubular portion 8A has a height H8 in the up-down direction. Tubular portion 8A has a second through-hole 8H passing through bracket 8 in the up-down direction. The material for bracket 8 is, for example, resin. Bracket 8 can be formed by being cut from an extrusion material having a constant cross-sectional shape in the direction orthogonal to the seat width direction.

Rib 8L projects leftward from the left side surface of tubular portion 8A, and rib 8R projects rightward from the right side surface of tubular portion 8A. Bracket 8 is arranged to allow first through-hole 7H formed in upper frame 7 and second through-hole 8H formed in bracket 8 to be aligned with each other in the up-down direction (FIG. 6).

Bracket 8 has a second inner edge portion P2. In the present embodiment, second inner edge portion P2 is formed of the end portion of tubular portion 8A which is located on the upper side. Second inner edge portion P2 defines, inside second inner edge portion P2, the opening of second through-hole 8H located opposite to upper frame 7. Second inner edge portion P2 is locked with a second locking portion 9E of holder 9, as will be described below in detail.

[Holder 9] Holder 9 includes a columnar portion A, a head 9B, a first locking portion 9D, and a second locking portion 9E. Columnar portion A has a shape extending in the up-down direction. Head 9B is provided at the upper end of columnar portion A. Insertion hole 9H into which headrest stay 4A (rod-shaped portion) is inserted is provided inside head 9B.

Elastically deformable plate springs are formed in the left side surface and the right side surface of columnar portion A to be displaced inwardly of columnar portion A in the seat width direction. First locking portion 9D is provided to project outwardly from the upper end of the plate spring. First locking portions 9D are provided in both the left side surface and the right side surface of columnar portion 9A. A gap is provided between tubular portion 8A and head 9B, and second locking portion 9E is formed of the lower surface of the gap.

First locking portion 9D is provided on one side (the lower side herein) of columnar portion A in the up-down direction, and second locking portion 9E is provided on the other side (the upper side herein) of columnar portion A in the up-down direction. First locking portion 9D and second locking portion 9E are apart from each other with a distance H9 therebetween in the up-down direction.

[Fixing of Bracket 8 and Holder 9 to Upper Frame 7]

As described above, opening 7HU provided in upper plate 7U of upper frame 7 is formed in upper plate 7U while leaving a part (upper surface 7U2) of upper plate 7U on the front side and a part (upper surface 7U3) of upper plate 7U on the rear side left (FIG. 8). In the present embodiment, upper frame 7 has upper surfaces 7U1, 7U2, and 7U3 and lower surface 7DS, and bracket 8 is arranged on upper surfaces 7U2 and 7U3. Bracket 8 is arranged to allow first through-hole 7H and second through-hole 8H to be aligned with each other in the up-down direction.

As described above, upper frame 7 has first upright wall 7F1 and second upright wall 7B1 opposed to each other with a spacing therebetween in the seat front-rear direction. With bracket 8 arranged on upper surfaces 7U2 and 7U3, bracket 8 is fitted between first upright wall 7F1 and second upright wall 7B1. Ribs 8L and 8R provided in bracket 8 are fitted inside groove 7G formed in upper frame 7. In this state, ribs 8L and 8R are located on upper surface 7U1 (FIGS. 6 and 7).

With reference to FIGS. 7 and 8, with bracket 8 arranged on upper surfaces 7U2 and 7U3 of upper frame 7, first inner edge portion P1 of upper frame 7 and second inner edge portion P2 of bracket 8 are apart from each other with a dimension (a sum of distance H7 and height H8) therebetween in the up-down direction. The sum of distance H7 and height H8 is set to be approximately equal to distance H9.

Holder 9 is inserted from above into second through-hole 8H of bracket 8, starting from a lower end 9C side of columnar portion A. As first locking portion 9D of holder 9 moves inside bracket 8 (second through-hole 8H), first locking portion 9D and the inner circumferential surface of bracket 8 interfere with each other, allowing first locking portion 9D to be elastically displaced inwardly of columnar portion A in the seat width direction.

Subsequently, first locking portion 9D of holder 9 passes through the inside (second through-hole 8H) of bracket 8 to reach opening 7HU on the upper side of first through-hole 7H. Inserting columnar portion A further causes first locking portion 9D of holder 9 to move between opening 7HU and opening 7HD and then reach opening 7HD on the lower side of first through-hole 7H.

As first locking portion 9D of holder 9 moves inside opening 7HD, first locking portion 9D and the inner circumferential surface of opening 7HD interfere with each other, allowing first locking portion 9D to be elastically displaced inwardly of columnar portion A in the seat width direction. Subsequently, first locking portion 9D of holder 9 passes through opening 7HD on the lower side of first through-hole 7H and is elastically displaced outwardly of columnar portion A in the seat width direction.

Holder 9 is arranged to allow a portion of columnar portion A between first locking portion 9D and second locking portion 9E to pass through both of first through-hole 7H of upper frame 7 and second through-hole 8H of bracket 8 (see FIGS. 7 and 8). In this state, first locking portion 9D is locked to first inner edge portion P1 and second locking portion 9E is locked to second inner edge portion P2 to allow first locking portion 9D and second locking portion 9E to retain upper frame 7 and bracket 8 therebetween in the up-down direction.

In the seat back frame 5 having the above configuration, bracket 8 and holder 9 are integrated with upper frame 7, and holder 9 is held so as not to come out of bracket 8 and upper frame 7 in the up-down direction. Unlike the configuration disclosed in the beginning, bracket 8 for fixing headrest 4 to seat back 3 can be fixed to upper frame 7 by an inexpensive, simple technique without a special downstream process such as a welding step or a plastic deformation step. Changing a position in upper frame 7 at which first through-hole 7H is provided allows seat back frame 5 to be easily applied to any type of vehicle seat 1.

[Another Configuration 1]

In the embodiment described above, bracket 8 is arranged on upper surfaces 7U2 and 7U3 of upper plate 7U of upper frame 7, leading to good assembly workability. However, this configuration is not absolutely necessary. For example, in the configuration shown in FIG. 8, the shape of tubular portion 8A of bracket 8 may be extended downward to allow tubular portion 8A of bracket 8 to be arranged on the upper surface of lower plate 7D of upper frame 7. Also in this configuration, first locking portion 9D is locked to first inner edge portion P1 and second locking portion 9E is locked to second inner edge portion P2 to allow first locking portion 9D and second locking portion 9E to retain upper frame 7 and bracket 8 therebetween in the up-down direction, leading to the operation and effect similar to those described above.

[Another Configuration 2]

Alternatively, bracket 8 may be arranged on lower surface 7DS of lower plate 7D of upper frame 7 (to be in contact with lower surface 7DS), below upper frame 7. In this case, the "first inner edge portion" is formed at the lower end of bracket 8 to allow first locking portion 9D of holder 9 to be locked to the lower end of bracket 8, and the "second inner edge portion" is formed in the upper surface of upper plate 7U of upper frame 7 to allow second locking portion 9E of holder 9 to be locked to the upper surface of upper plate 7U of upper frame 7. Also in this configuration, first locking portion 9D is locked to the first inner edge portion and second locking portion 9E is locked to the second inner edge portion to allow first locking portion 9D and second locking portion 9E to retain upper frame 7 and bracket 8 therebetween in the up-down direction, leading to the operation and effect similar to those described above.

[Another Configuration 3]

In the above embodiment, upper frame 7 has first upright wall 7F1 and second upright wall 7B1 that are opposed to each other with a spacing in the seat front-rear direction, and bracket 8 is fitted between first upright wall 7F1 and second upright wall 7B1. This configuration achieves good workability of assembling bracket 8 to upper frame 7, causes bracket 8 to topple less easily with bracket 8 placed on upper frame 7, and also achieves an effect of positioning bracket 8. This configuration is adoptable as necessary.

[Another Configuration 4]

In the above embodiment, bracket 8 has ribs 8L and 8R projecting from the left and right side surfaces of tubular portion 8A in the seat width direction, groove 7G extending in the seat width direction is formed in the upper surface of upper frame 7, and ribs 8L and 8R are fitted inside groove 7G. This configuration achieves good workability of assembling bracket 8 to upper frame 7, causes bracket 8 to topple less easily with bracket 8 placed on upper frame 7, and also achieves an effect of positioning bracket 8. This configuration is adoptable as necessary.

[Another Configuration 5]

In the above embodiment, upper frame 7 can be easily fabricated by being cut from an extrusion material having a constant cross-sectional shape in the direction orthogonal to the seat width direction. Upper frame 7 may be appropriately provided with screw fastening portions or the like for fixing side frames 6L and 6R. The same applies to bracket 8.

The above contents of the present disclosure are summarized as follows.

The seat back frame disclosed herein includes an upper frame, a bracket, and a holder. The upper frame has a first through-hole passing therethrough in an up-down direction and extends in a seat width direction. The bracket has a second through-hole passing therethrough in the up-down direction and is arranged to allow the first through-hole and the second through-hole to be aligned with each other in the up-down direction. The holder includes a columnar portion extending in the up-down direction and a first locking portion and a second locking portion provided respectively on one side and another side of the columnar portion in the up-down direction. A portion of the columnar portion between the first locking portion and the second locking portion is arranged to pass through both the first through-hole and the second through-hole. The upper frame includes a first inner edge portion, and the first inner edge portion inwardly defines an opening of the first through-hole located opposite to the bracket. The bracket includes a second inner edge portion, and the second inner edge portion inwardly defines an opening of the second through-hole located opposite to the upper frame. The first locking portion is locked to the first inner edge portion and the second locking portion is locked to the second inner edge portion to allow the first locking portion and the second locking portion to retain the upper frame and the bracket therebetween in the up-down direction.

The upper frame may include an upper surface and a lower surface, and the bracket may be arranged on the upper surface.

In the seat back frame, the upper frame may further include a first upright wall and a second upright wall opposed to each other with a spacing therebetween in a seat front-rear direction, and the bracket may be fitted between the first upright wall and the second upright wall.

In the seat back frame, the bracket may further include a rib projecting in the seat width direction. The upper surface of the upper frame may have a groove extending in the seat width direction, and the rib may be fitted inside the groove.

In the seat back frame, the upper frame may be formed by being cut from an extrusion material having a constant cross-sectional shape in a direction orthogonal to the seat width direction.

In the seat back frame, the bracket may be formed by being cut from an extrusion material having a constant cross-sectional shape in a direction orthogonal to the up-down direction.

The seat back frame disclosed herein allows a bracket for fixing a headrest to a seat back to be fixed to an upper frame using a locking structure by a technique simpler than a conventional technique.

Although the embodiments of the present disclosure have been described and illustrated in detail, it is clearly understood that the same is by way of illustration and example only and is not to be taken by way of limitation. It is therefore intended that the scope of the present invention is defined by claims, and encompasses all modifications and variations equivalent in meaning and scope to the claims.

What is claimed is:

1. A seat back frame comprising:
   an upper frame having a first through-hole passing therethrough in an up-down direction, the upper frame extending in a seat width direction;
   a bracket having a second through-hole passing therethrough in the up-down direction, the bracket being arranged to allow the first through-hole and the second through-hole to be aligned with each other in the up-down direction; and
   a holder including a columnar portion extending in the up-down direction and a first locking portion and a second locking portion provided respectively on one side and another side of the columnar portion in the up-down direction, a portion of the columnar portion between the first locking portion and the second locking portion being arranged to pass through both the first through-hole and the second through-hole,
   the upper frame including a first inner edge portion, the first inner edge portion inwardly defining an opening of the first through-hole located opposite to the bracket,
   the bracket including a second inner edge portion, the second inner edge portion inwardly defining an opening of the second through-hole located opposite to the upper frame,
   the first locking portion being locked to the first inner edge portion and the second locking portion being locked to the second inner edge portion to allow the first locking portion and the second inner edge portion to retain the upper frame and the bracket therebetween in the up-down direction.

2. The seat back frame according to claim 1, wherein
   the upper frame includes an upper surface and a lower surface, and
   the bracket is arranged on the upper surface.

3. The seat back frame according to claim 2, wherein
   the upper frame further includes a first upright wall and a second upright wall opposed to each other with a spacing therebetween in a seat front-rear direction, and
   the bracket is fitted between the first upright wall and the second upright wall.

4. The seat back frame according to claim 2, wherein
   the bracket further includes a rib projecting in the seat width direction, the upper surface of the upper frame has a groove extending in the seat width direction, and
the rib is fitted inside the groove.

5. The seat back frame according to claim 1, wherein the upper frame is formed by being cut from an extrusion material having a constant cross-sectional shape in a direction orthogonal to the seat width direction.

6. The seat back frame according to claim 1, wherein the bracket is formed by being cut from an extrusion material having a constant cross-sectional shape in a direction orthogonal to the up-down direction.

\* \* \* \* \*